US012658122B2

(12) United States Patent
Zhang et al.

(10) Patent No.: US 12,658,122 B2
(45) Date of Patent: Jun. 16, 2026

(54) DISPLAY PANEL FPS SWITCHING

(71) Applicant: QUALCOMM Incorporated, San Diego, CA (US)

(72) Inventors: Nan Zhang, Beijing (CN); Yongjun Xu, Beijing (CN); Wenkai Yao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 18/025,176

(22) PCT Filed: Oct. 9, 2020

(86) PCT No.: PCT/CN2020/119926

§ 371 (c)(1),
(2) Date: Mar. 7, 2023

(87) PCT Pub. No.: WO2022/073182

PCT Pub. Date: Apr. 14, 2022

(65) Prior Publication Data

US 2023/0335049 A1 Oct. 19, 2023

(51) Int. Cl.
*G09G 3/3208* (2016.01)
*G09G 3/20* (2006.01)

(52) U.S. Cl.
CPC ......... *G09G 3/3208* (2013.01); *G09G 3/2096* (2013.01); *G09G 2340/0435* (2013.01); *G09G 2360/16* (2013.01)

(58) Field of Classification Search
CPC ............... G09G 3/3291; G09G 3/3233; G09G 2300/0819; G09G 2300/0842;
(Continued)

(56) References Cited

U.S. PATENT DOCUMENTS 10,789,913 B2 9/2020 Yadav et al.
2007/0285428 A1* 12/2007 Foster ...................... G06F 3/14 345/503
(Continued)

FOREIGN PATENT DOCUMENTS

CN 102163407 A 8/2011
CN 103109267 A 5/2013
(Continued)

OTHER PUBLICATIONS

Supplementary European Search Report—EP20956497—Search Authority—Munich—Jun. 7, 2024.
(Continued)

*Primary Examiner* — Shaheda A Abdin
(74) *Attorney, Agent, or Firm* — Procopio, Cory, Hargreaves & Savitch LLP

(57) ABSTRACT

The present disclosure relates to methods and devices for display processing including an apparatus, e.g., a display processor. In some aspects, the apparatus may store one or more pixel conversion factors for at least one display panel. The apparatus may also determine whether to switch from a previous frame refresh rate to an updated frame refresh rate at the at least one display panel. Additionally, the apparatus may identify, upon determining to switch from the previous frame refresh rate to the updated frame refresh rate, a pixel conversion factor of the one or more pixel conversion factors associated with the updated frame refresh rate. The apparatus may also refresh the at least one display panel based on the updated frame refresh rate associated the pixel conversion factor.

43 Claims, 6 Drawing Sheets

(58) Field of Classification Search
CPC ... G09G 2340/0435; G09G 2310/0272; G09G 2320/0214; G09G 2330/021; G09G 2300/0861; H10K 59/1213
See application file for complete search history.

(56) References Cited

U.S. PATENT DOCUMENTS

| | | | | |
|---|---|---|---|---|
| 2008/0001934 | A1 | 1/2008 | Wyatt | |
| 2008/0018655 | A1 | 1/2008 | Han et al. | |
| 2009/0115703 | A1 * | 5/2009 | Cok | G09G 3/3233 345/76 |
| 2009/0115705 | A1 * | 5/2009 | Miller | G09G 3/3208 345/76 |
| 2014/0232708 | A1 * | 8/2014 | Kitazawa | G09G 5/10 345/207 |
| 2014/0267448 | A1 | 9/2014 | Albrecht et al. | |
| 2015/0103104 | A1 | 4/2015 | Lee et al. | |
| 2016/0155399 | A1 | 6/2016 | Tripathi et al. | |
| 2017/0064309 | A1 * | 3/2017 | Sethuraman | H04N 19/577 |
| 2018/0090084 | A1 | 3/2018 | Zheng et al. | |
| 2019/0180695 | A1 | 6/2019 | Ha et al. | |
| 2020/0234501 | A1 * | 7/2020 | Rodriguez | G06T 19/006 |

FOREIGN PATENT DOCUMENTS

| | | | | |
|---|---|---|---|---|
| CN | 105074807 | A | 11/2015 | |
| CN | 105390082 | A | 3/2016 | |
| CN | 105793915 | A | 7/2016 | |
| CN | 105869560 | A | 8/2016 | |
| CN | 109903725 | A | 6/2019 | |
| CN | 110491351 | A | * 11/2019 | G09G 3/3607 |
| CN | 110890073 | A | 3/2020 | |
| KR | 20190069667 | A | 6/2019 | |
| WO | 2019135910 | | 7/2019 | |

OTHER PUBLICATIONS

International Search Report and Written Opinion—PCT/CN2020/119926—ISA/EPO—Jul. 7, 2021.
Taiwan Search Report—TW110134040—TIPO—Jun. 27, 2025.

* cited by examiner

DISPLAY PANEL FPS SWITCHING

CROSS REFERENCE TO RELATED APPLICATION(S)

This application is a National Stage Application filed under 35 U.S.C. § 371 of PCT International Application No. PCT/CN2020/119926, entitled “METHODS AND APPARATUS FOR DISPLAY PANEL FPS SWITCHING” and filed Oct. 9, 2020, which is expressly incorporated by reference herein in its entirety.

TECHNICAL FIELD

The present disclosure relates generally to processing systems and, more particularly, to one or more techniques for display processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), an application processor (AP), a display controller, a display driver integrated circuit (DDIC), a display panel, and/or any apparatus that can perform display processing. The apparatus may store one or more pixel conversion factors for at least one display panel. The apparatus may also determine whether to switch from a previous frame refresh rate to an updated frame refresh rate at the at least one display panel. The apparatus may also switch, upon determining to switch from the previous frame refresh rate to the updated frame refresh rate, the at least one display panel to the updated frame refresh rate. Additionally, the apparatus may identify, upon determining to switch from the previous frame refresh rate to the updated frame refresh rate, a pixel conversion factor of the one or more pixel conversion factors associated with the updated frame refresh rate. The apparatus may also refresh the at least one display panel based on the updated frame refresh rate associated the pixel conversion factor. The apparatus may also transmit the pixel conversion factor of the one or more pixel conversion factors associated with the updated frame refresh rate. Further, the apparatus may open at least one adaptive variable rate (AVR) component upon transmitting the pixel conversion factor. The apparatus may also stop refreshing an internal refresh of the at least one display panel upon opening the at least one AVR component. The apparatus may also apply the pixel conversion factor associated with the updated frame refresh rate upon transmitting the pixel conversion factor. Moreover, the apparatus may communicate pixel data for a next frame based on the updated frame refresh rate. The apparatus may also close at least one adaptive variable rate (AVR) component upon communicating the pixel data for the next frame.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
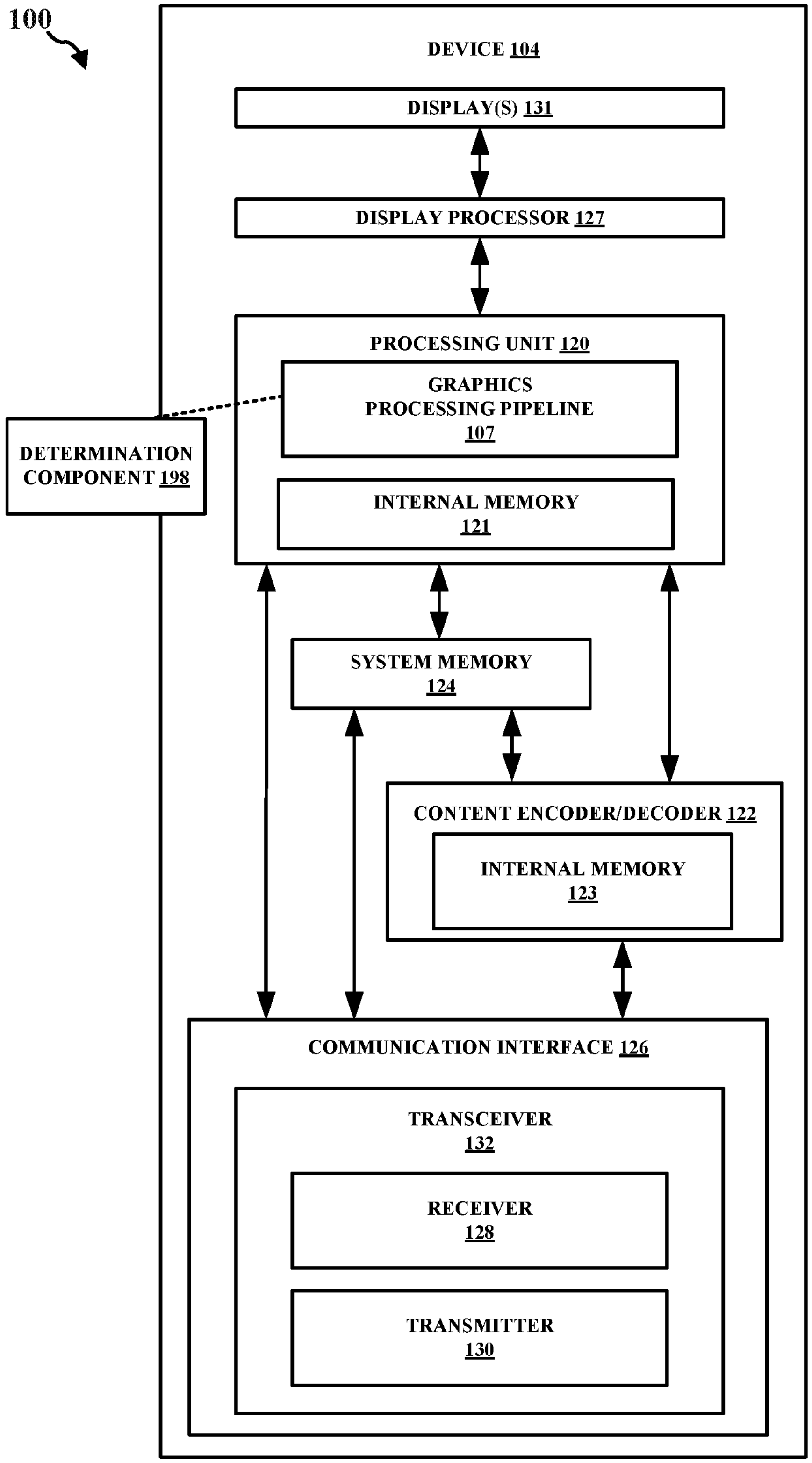
FIG. 1 is a block diagram that illustrates an example content generation system in accordance with one or more techniques of this disclosure.

In some types of smartphones, certain types of display panels may support a number of different frame refresh rates or FPS in order to achieve panel flexibility. For example, in certain types of display panels, e.g., 144 Hz OLED panels, the panel may support certain types of frame refresh rates or FPS, e.g., 144 Hz, 120 Hz, 90 Hz, 60 Hz, 50 Hz, and/or 30 Hz FPS, in order to achieve a high panel flexibility. However, this may be difficult to achieve considering the high cost of certain display panels, e.g., OLED panels, as well as the memory size limit within the display processor, e.g., a DDIC or flash size limit. In addition to cost limitations for certain types of display panels, e.g., OLED panels, the display processor size, e.g., DDIC or flash size, may be another factor that can limit the memory capacity of a smartphone, e.g., a DDIC flash capacity. Further, some display panels, e.g., OLED display panels, may utilize a large display in order to achieve a high display visual range, e.g., 100% display visual range. Accordingly, as some types of display panels may utilize a large display in order to achieve a high display visual range, there may be a small storage space for the display controller, e.g., DDIC or flash chip. In some aspects, in order to support an increased frame refresh rate or FPS, the DDIC or flash chip size may be increased. However, doing so may be a challenge to display panel or smartphone manufacturers based on the limited size for the DDIC or flash chip. Aspects of the present disclosure may support an increased frame refresh rate or FPS configuration for display panels, e.g., OLED panels. For instance, aspects of the present disclosure can support an increased frame refresh rate or FPS without increasing the panel cost or increasing a DDIC size or flash size. Aspects of the present disclosure may also provide OLED panels including different FPS specifications with a large DDIC flash capacity. This DDIC flash capacity of the present disclosure may store different pixel conversion factors or gamma tables for a display brightness value (DBV) range of each individual frame refresh rate or FPS.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term “content” may refer to “graphical content,” “image,” and vice versa. This is true regardless of whether the terms are being used as an adjective, noun, or other parts of speech. In some examples, as used herein, the term “graphical content” may refer to a content produced by one or more processes of a graphics processing pipeline. In some examples, as used herein, the term “graphical content” may refer to a content produced by a processing unit configured to perform graphics processing. In some examples, as used herein, the term “graphical content” may refer to a content produced by a graphics processing unit.

In some examples, as used herein, the term “display content” may refer to content generated by a processing unit configured to perform displaying processing. In some examples, as used herein, the term “display content” may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term “non-transitory” may indicate that the storage medium is not embodied in a carrier wave or a propagated signal. However, the term “non-transitory” should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to store one or more pixel conversion factors for at least one display panel. The determination component 198 can also be configured to determine whether to switch from a previous frame refresh rate to an updated frame refresh rate at the at least one display panel. The determination component 198 can also be configured to switch, upon determining to switch from the previous frame refresh rate to the updated frame refresh rate, the at least one display panel to the updated frame refresh rate. The determination component 198 can also be configured to identify, upon determining to switch from the previous frame refresh rate to the updated frame refresh rate, a pixel conversion factor of the one or more pixel conversion factors associated with the updated frame refresh rate. The determination component 198 can also be configured to refresh the at least one display panel based on the updated frame refresh rate associated the pixel conversion factor. The determination component 198 can also be configured to transmit the pixel conversion factor of the one or more pixel conversion factors associated with the updated frame refresh rate. The determination component 198 can also be configured to open at least one adaptive variable rate (AVR) component upon transmitting the pixel conversion factor. The determination component 198 can also be configured to stop refreshing an internal refresh of the at least one display panel upon opening the at least one AVR component. The determination component 198 can also be configured to apply the pixel conversion factor associated with the updated frame refresh rate upon transmitting the pixel conversion factor. The determination component 198 can also be configured to communicate pixel data for a next frame based on the updated frame refresh rate. The determination component 198 can also be configured to close at least one adaptive variable rate (AVR) component upon communicating the pixel data for the next frame.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may change the corresponding context. Additionally, the workload that corresponds to the mode or state may follow the changing mode or state.

Figure 2:
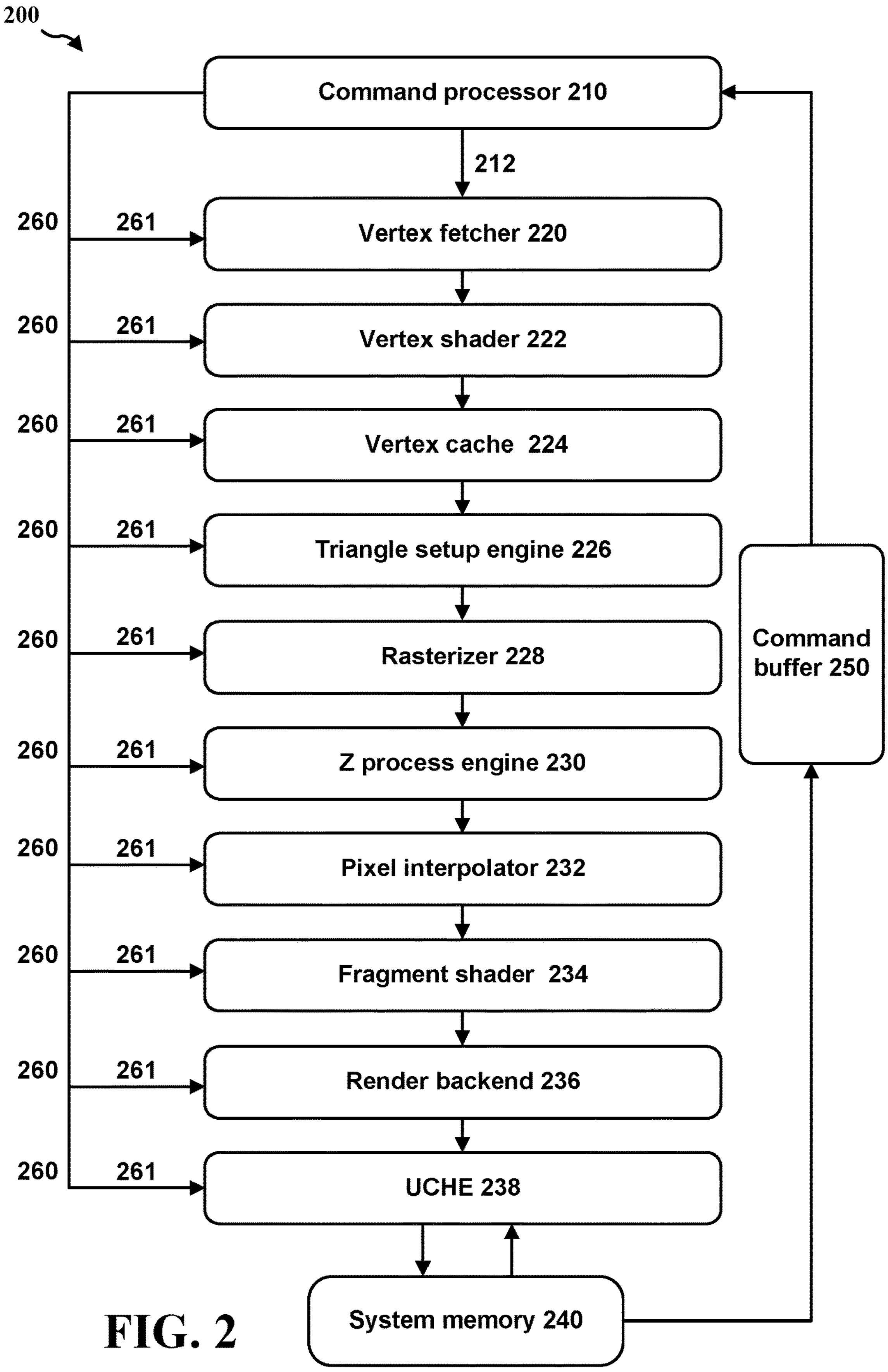
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some types of smartphones, e.g., high tier smartphones or smartphones with organic light emitting diode (OLED) display panels, displays with a high frame refresh rate or high frames-per-second (FPS) may correspond to a standard configuration, e.g., displays with an FPS of 120 Hz or above. In order to save power and align with different preferences for each application of a smartphone, display panels, e.g., OLED display panels, may support multiple types frame refresh rates or FPS. For instance, the more types of frame refresh rates or FPS that are supported by a display panel, e.g., an OLED display panel, the more capacity or memory may be utilized at a display processor, e.g., a display controller or display driver integrated circuit (DDIC). For each individual frame refresh rate or FPS, the display panel may store different gamma tables for different panel display brightness value (DBV) ranges.

In some aspects, certain types of display panels may support a number of different frame refresh rates or FPS in order to achieve panel flexibility. For example, in certain types of display panels, e.g., 144 Hz OLED panels, the panel may support certain types of frame refresh rates or FPS, e.g., 144 Hz, 120 Hz, 90 Hz, 60 Hz, 50 Hz, and/or 30 Hz FPS, in order to achieve a high panel flexibility. However, this may be difficult to achieve considering the high cost of certain display panels, e.g., OLED panels, as well as the memory size limit within the display processor, e.g., a DDIC or flash size limit.

As indicated herein, in addition to cost limitations for certain types of display panels, e.g., OLED panels, the display processor size, e.g., a DDIC or flash size, may be another factor that can limit the memory capacity of a smartphone, e.g., a DDIC flash capacity. Further, some display panels, e.g., OLED display panels, may utilize a large display in order to achieve a high display visual range, e.g., 100% display visual range. Accordingly, as some types of display panels may utilize a large display in order to achieve a high display visual range, there may be a small storage space for the display controller, e.g., DDIC or flash chip.

In some aspects, in order to support an increased frame refresh rate or FPS, the DDIC or flash chip size may be increased. However, doing so may be a challenge to display panel or smartphone manufacturers based on the limited size for the DDIC or flash chip. Based on the above, it may be beneficial to support an increased frame refresh rate or FPS configuration for display panels, e.g., OLED panels, without increasing the panel cost and/or increasing the DDIC or flash size. For example, it may be beneficial to provide OLED panels including different FPS specifications with a large DDIC flash capacity to store different pixel conversion factors or gamma tables for the DBV range of each FPS.

Aspects of the present disclosure may support an increased frame refresh rate or FPS configuration for display panels, e.g., OLED panels. For instance, aspects of the present disclosure can support an increased frame refresh rate or FPS without increasing the panel cost or increasing a DDIC size or flash size. Aspects of the present disclosure may also provide OLED panels including different FPS specifications with a large DDIC flash capacity. The DDIC flash capacity of the present disclosure may store different pixel conversion factors or gamma tables for a DBV range of each individual frame refresh rate or FPS.

Figure 3:
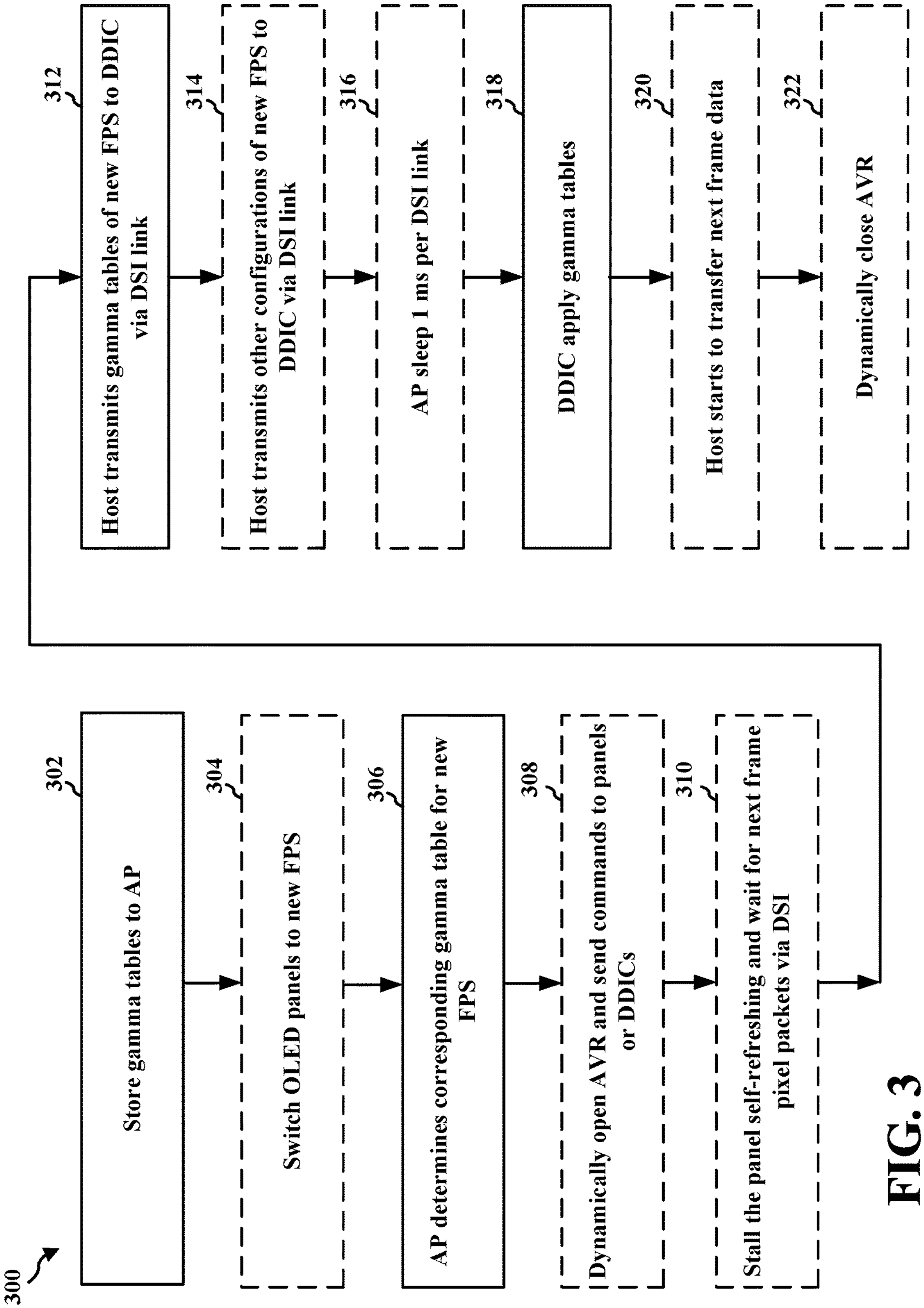
FIG. 3 illustrates an example flowchart of display processing in accordance with one or more techniques of this disclosure.

FIG. 3 illustrates flowchart 300 of display processing in accordance with one or more techniques of this disclosure. As shown in FIG. 3, flowchart 300 includes a number of steps or processes for display processing. At 302, aspects of the present disclosure may store gamma tables including a number of pixel conversion factors to an AP. At 304, aspects of the present disclosure may switch one or more OLED panels to an updated frame refresh rate or FPS.

At 306, aspects of the present disclosure may determine, at an AP, a corresponding gamma table for the updated frame refresh rate or FPS. At 308, aspects of the present disclosure may dynamically open an AVR component and/or send multiple commands to display panels or DDICs. At 310, aspects of the present disclosure may stall a self-refreshing at a display panel and/or wait for next frame pixel packets via a display serial interface (DSI). At 312, aspects of the present disclosure may transmit, at a host device, gamma tables including a number of pixel conversion factors of an updated frame refresh rate or FPS to a DDIC via a DSI link.

At 314, aspects of the present disclosure may transmit, at a host device, other configurations of an updated frame refresh rate or FPS to a DDIC via a DSI link. At 316, aspects of the present disclosure may sleep, at an AP, a certain time period, e.g., 1 ms, per DSI link. At 318, aspects of the present disclosure may apply, at a DDIC, gamma tables including a number of pixel conversion factors. At 320, aspects of the present disclosure may transfer, at a host device, frame data of a next frame. At 322, aspects of the present disclosure may dynamically close an AVR component.

In some aspects of the present disclosure, as depicted in FIG. 3, at least one gamma table or multiple pixel conversion factors may be stored at an application processor (AP). Also, at least one display panel, e.g., at least one OLED panel, may be switched or adjusted to a new frame refresh rate or FPS. Further, a corresponding gamma table or pixel conversion factor may be determined for an updated frame refresh rate or updated FPS.

In some instances, at least one display panel may be refreshed based on the updated frame refresh rate or FPS associated with the pixel conversion factor. Moreover, the panel may stall a self-refresh, as well as wait for next frame pixel packets via a display serial interface (DSI) link. As such, a command mode OLED panel may stall its own internal refreshing in order to wait for a new frame transfer. An adaptive variable rate (AVR) component may also be dynamically opened to provide a longer vertical blanking interval (VBI) or Vblank time in order to transfer new FPS gamma tables and other parameters, e.g., via a DSI link.

In some aspects, a host device may transmit one or more pixel conversion factors or gamma tables and/or parameters of the new FPS to the DDIC via a DSI link. The host device can then transmit other configurations of the updated frame refresh rate or FPS to a DDIC via a DSI link. The AP can then sleep for an amount of time, e.g., 1 ms or another pre-defined delay time. Additionally, the DDIC can apply the gamma tables or pixel conversion factors. The AP can then start to transfer the new frame pixel data via a DSI link. Finally, the AP can dynamically close the AVR component.

Figure 4:
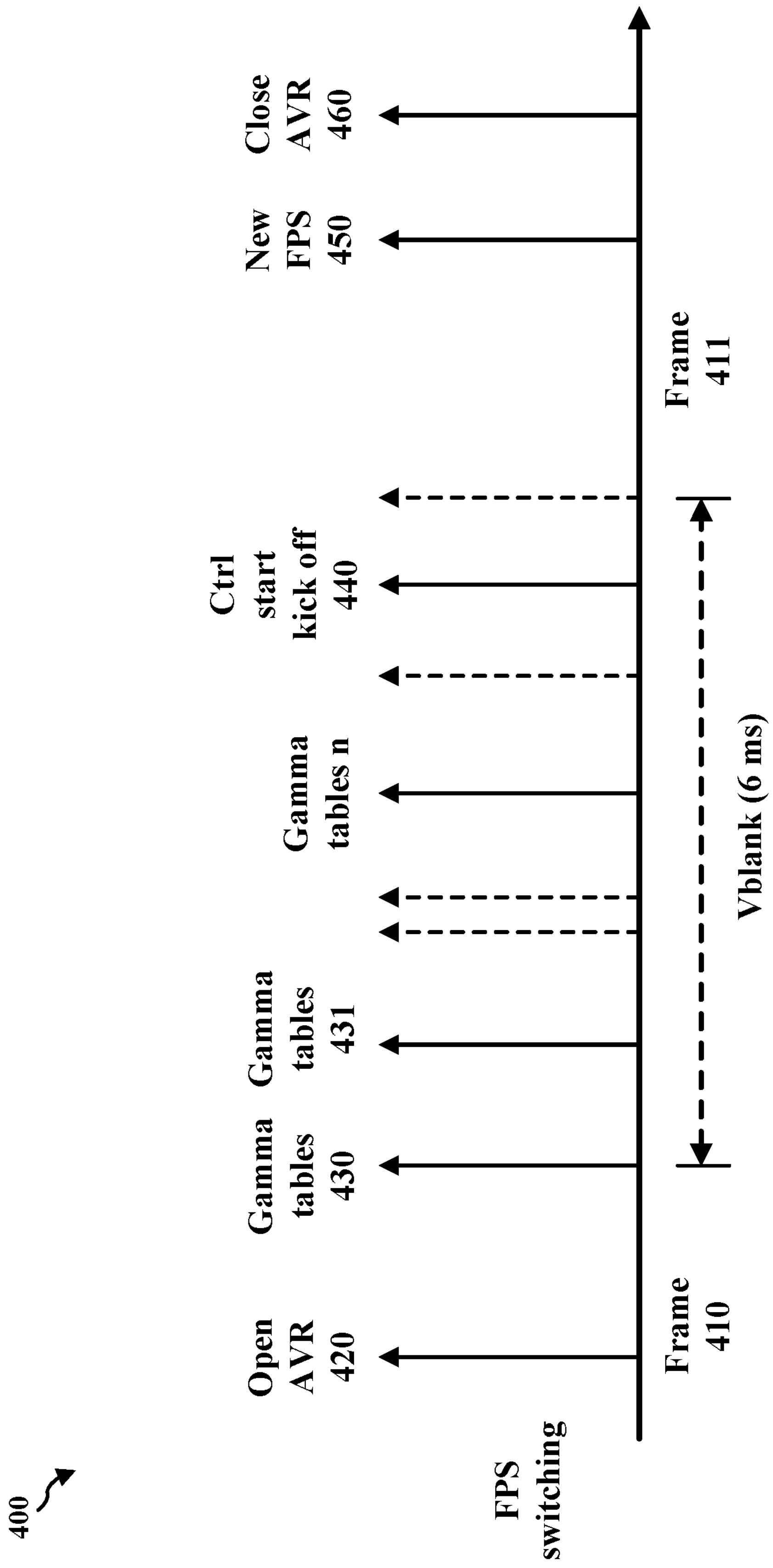
FIG. 4 illustrates an example timing diagram of display processing in accordance with one or more techniques of this disclosure.

FIG. 4 illustrates timing diagram 400 of display processing in accordance with one or more techniques of this disclosure. More specifically, FIG. 4 displays a timing diagram for FPS switching. As shown in FIG. 4, diagram 400 includes multiple frames, e.g., frame 410 and frame 411. FIG. 4 also includes a number of steps or processes, e.g., open AVR component 420, gamma tables transmission 430, gamma tables transmission 431, gamma tables transmission n, control start kick off 440, new FPS 450, and close AVR component 460. Additionally, FIG. 4 shows a Vblank time period, e.g., 6 ms.

Aspects of the present disclosure can include a number of benefits or advantages. For instance, aspects of the present disclosure can help to reduce the cost of display panels, e.g., OLED panels or DDICs, and provide a different native support for frame refresh rates or FPS. Aspects of the present disclosure can also help to reduce the size of a DDIC or flash size, e.g., OLED panels DDIC or flash size. Further, aspects of the present disclosure can help to provide an improved OLED visual quality, such as via supporting longer or larger gamma tables with an increased amount of pixel conversion factors at the DDIC, e.g., OLED panels DDIC.

Figure 5:
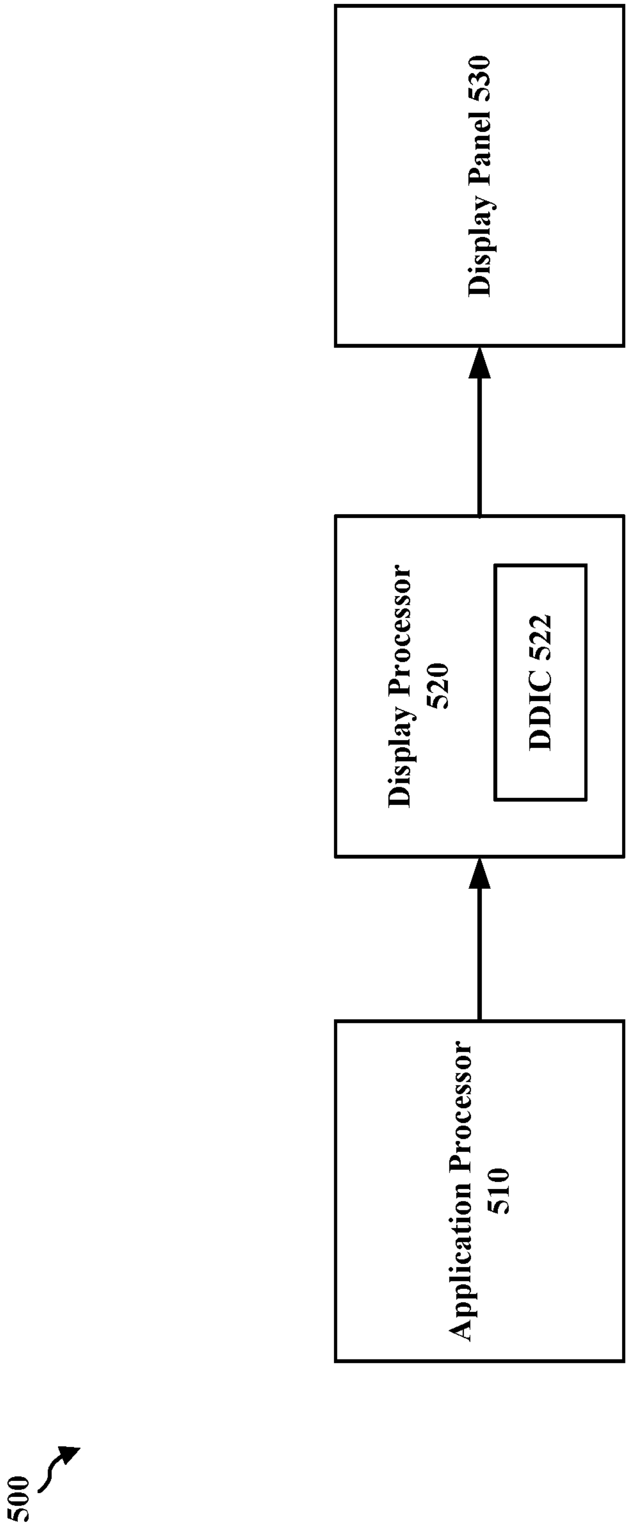
FIG. 5 illustrates an example diagram of display processing components in accordance with one or more techniques of this disclosure.

FIG. 5 illustrates diagram 500 of display processing components in accordance with one or more techniques of this disclosure. As shown in FIG. 5, diagram 500 includes application processor (AP) 510, display processor or DPU 520 including DDIC 522, and display panel 530. FIG. 5 depicts the display processing components that may be utilized at a smartphone or host device. Aspects of the present disclosure may utilize the components in FIG. 5 in order to reduce the size of a DDIC or flash chip and/or improve the OLED visual quality.

FIGS. 3-5 illustrate examples of the aforementioned methods and processes for display processing. As shown in FIGS. 3-5, aspects of the present disclosure, e.g., APs, display processors, DPUs, display controllers, DDICs, or display panels herein, can perform a number of different steps or processes for display processing in order to reduce the size of a DDIC or flash and/or improve the visual quality of the display panel or OLED.

As shown in FIGS. 3-5, APs or display processors herein, e.g., AP 510, may store one or more pixel conversion factors for at least one display panel. In some aspects, the one or more pixel conversion factors may correspond to at least one gamma table. Also, the one or more pixel conversion factors may be associated with a conversion from a digital pixel value to an analog pixel luminance value and/or a conversion from a digital sub-pixel value to an analog sub-pixel luminance value.

APs or display processors herein, e.g., AP 510, may also determine whether to switch from a previous frame refresh rate to an updated frame refresh rate at the at least one display panel, e.g., display panel 530.

APs or display processors herein, e.g., AP 510 or display processor 520, may also switch, upon determining to switch from the previous frame refresh rate to the updated frame refresh rate, the at least one display panel, e.g., display panel 530, to the updated frame refresh rate. Moreover, the at least one display panel, e.g., display panel 530, may be switched to the updated frame refresh rate by an AP, e.g., AP 510.

Additionally, APs or display processors herein, e.g., AP 510 or display processor 520, may identify, upon determining to switch from the previous frame refresh rate to the updated frame refresh rate, a pixel conversion factor of the one or more pixel conversion factors associated with the updated frame refresh rate. The one or more pixel conversion factors may be associated with at least one of a brightness level or a frame refresh rate of the at least one display panel, e.g., display panel 530.

APs or display processors herein, e.g., AP 510 or display processor 520, may also refresh the at least one display panel, e.g., display panel 530, based on the updated frame refresh rate associated the pixel conversion factor. In some instances, the updated frame refresh rate may correspond to at least one of a frame refresh time or a frame-per-second (FPS) value of the at least one display panel, e.g., display panel 530.

APs or display processors herein, e.g., AP 510 or display processor 520, may also transmit the pixel conversion factor of the one or more pixel conversion factors associated with the updated frame refresh rate. In some instances, an AP, e.g., AP 510, may sleep for a time period after the pixel conversion factor is transmitted. Also, the pixel conversion factor may be transmitted to a display processor, e.g., display processor 520, or a display driver integrated circuit (DDIC), e.g., DDIC 522, via a display serial interface (DSI) link.

Further, APs or display processors herein, e.g., AP 510 or display processor 520, may open at least one adaptive variable rate (AVR) component upon transmitting the pixel conversion factor. In some aspects, the at least one AVR component may be opened based on a command from an AP, e.g., AP 510, to a display driver integrated circuit (DDIC), e.g., DDIC 522.

APs or display processors herein, e.g., AP 510 or display processor 520, may also stop refreshing an internal refresh of the at least one display panel, e.g., display panel 530, upon opening the at least one AVR component.

APs or display processors herein, e.g., AP 510 or display processor 520, may also apply the pixel conversion factor associated with the updated frame refresh rate upon transmitting the pixel conversion factor.

Moreover, APs or display processors herein, e.g., AP 510 or display processor 520, may communicate pixel data for a next frame, e.g., frame 411, based on the updated frame refresh rate.

APs or display processors herein, e.g., AP 510 or display processor 520, may also close at least one adaptive variable rate (AVR) component upon communicating the pixel data for the next frame, e.g., frame 411. In some aspects, the at least one AVR component may be closed based on a command from an AP, e.g., AP 510, to a display driver integrated circuit (DDIC), e.g., DDIC 522.

Figure 6:
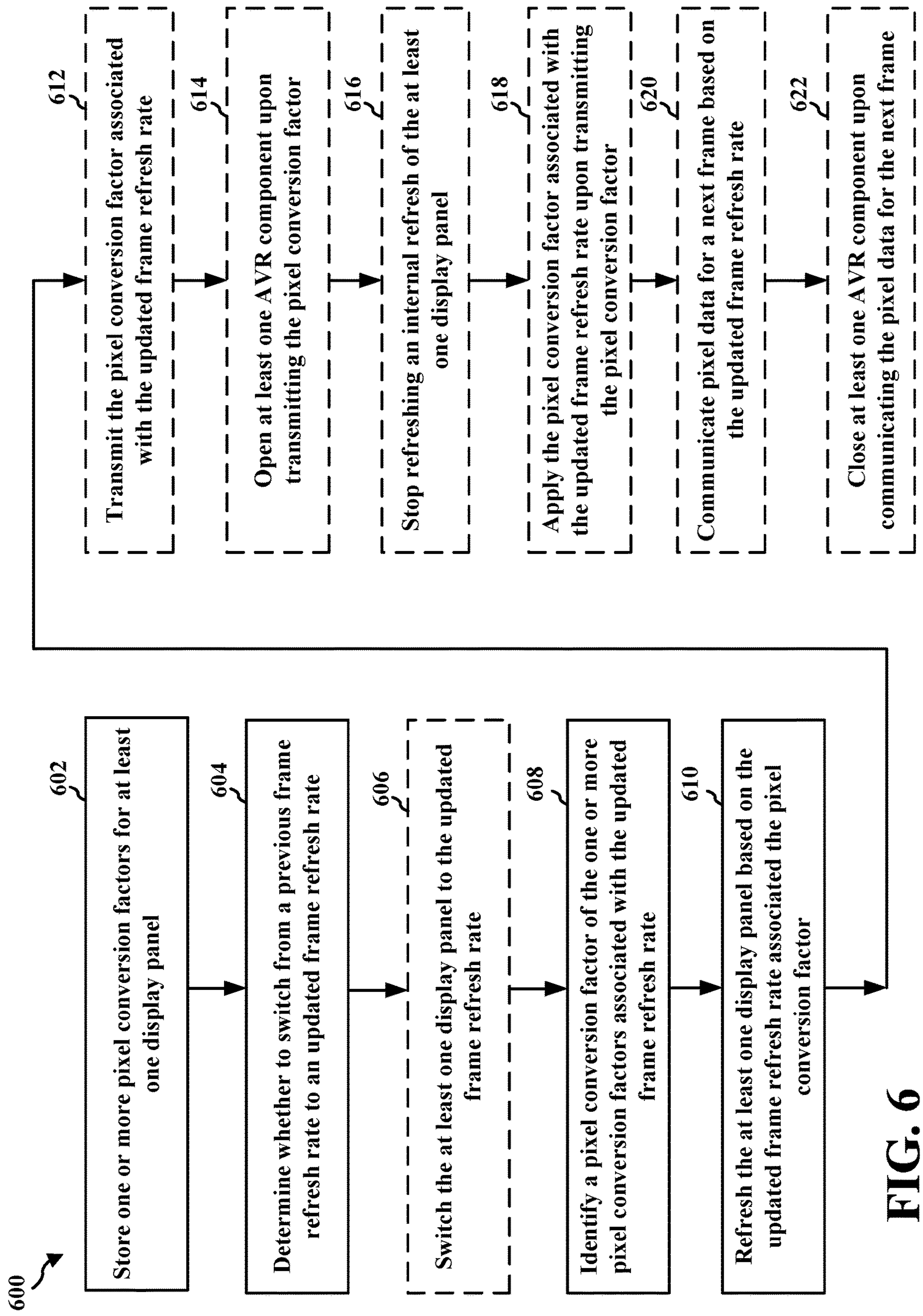
FIG. 6 illustrates an example flowchart of an example method in accordance with one or more techniques of this disclosure.

FIG. 6 illustrates a flowchart 600 of an example method in accordance with one or more techniques of this disclosure. The method may be performed by an apparatus such as an AP, a display processor, a DPU, a display controller, a DDIC, a display panel, or an apparatus for display processing.

At 602, the apparatus may store one or more pixel conversion factors for at least one display panel, as described in connection with the examples in FIGS. 3, 4, and 5. In some aspects, the one or more pixel conversion factors may correspond to at least one gamma table, as described in connection with the examples in FIGS. 3, 4, and 5. Also, the one or more pixel conversion factors may be associated with a conversion from a digital pixel value to an analog pixel luminance value and/or a conversion from a digital sub-pixel value to an analog sub-pixel luminance value, as described in connection with the examples in FIGS. 3, 4, and 5.

At 604, the apparatus may determine whether to switch from a previous frame refresh rate to an updated frame refresh rate at the at least one display panel, as described in connection with the examples in FIGS. 3, 4, and 5.

At 606, the apparatus may switch, upon determining to switch from the previous frame refresh rate to the updated frame refresh rate, the at least one display panel to the updated frame refresh rate, as described in connection with the examples in FIGS. 3, 4, and 5. Moreover, the at least one display panel may be switched to the updated frame refresh rate by an AP, as described in connection with the examples in FIGS. 3, 4, and 5.

At 608, the apparatus may identify, upon determining to switch from the previous frame refresh rate to the updated frame refresh rate, a pixel conversion factor of the one or more pixel conversion factors associated with the updated frame refresh rate, as described in connection with the examples in FIGS. 3, 4, and 5. The one or more pixel conversion factors may be associated with at least one of a brightness level or a frame refresh rate of the at least one display panel, as described in connection with the examples in FIGS. 3, 4, and 5.

At 610, the apparatus may refresh the at least one display panel based on the updated frame refresh rate associated the pixel conversion factor, as described in connection with the examples in FIGS. 3, 4, and 5. In some instances, the updated frame refresh rate may correspond to at least one of a frame refresh time or a frame-per-second (FPS) value of the at least one display panel, as described in connection with the examples in FIGS. 3, 4, and 5.

At 612, the apparatus may transmit the pixel conversion factor of the one or more pixel conversion factors associated with the updated frame refresh rate, as described in connection with the examples in FIGS. 3, 4, and 5. In some instances, an AP may sleep for a time period after the pixel conversion factor is transmitted, as described in connection with the examples in FIGS. 3, 4, and 5. Also, the pixel conversion factor may be transmitted to a display processor or a display driver integrated circuit (DDIC) via a display serial interface (DSI) link, as described in connection with the examples in FIGS. 3, 4, and 5.

At 614, the apparatus may open at least one adaptive variable rate (AVR) component upon transmitting the pixel conversion factor, as described in connection with the examples in FIGS. 3, 4, and 5. In some aspects, the at least one AVR component may be opened based on a command from an application processor (AP) to a display driver integrated circuit (DDIC), as described in connection with the examples in FIGS. 3, 4, and 5.

At 616, the apparatus may stop refreshing an internal refresh of the at least one display panel upon opening the at least one AVR component, as described in connection with the examples in FIGS. 3, 4, and 5.

At 618, the apparatus may apply the pixel conversion factor associated with the updated frame refresh rate upon transmitting the pixel conversion factor, as described in connection with the examples in FIGS. 3, 4, and 5.

At 620, the apparatus may communicate pixel data for a next frame based on the updated frame refresh rate, as described in connection with the examples in FIGS. 3, 4, and 5.

At 622, the apparatus may close at least one adaptive variable rate (AVR) component upon communicating the pixel data for the next frame, as described in connection with the examples in FIGS. 3, 4, and 5. In some aspects, the at least one AVR component may be closed based on a command from an application processor (AP) to a display driver integrated circuit (DDIC), as described in connection with the examples in FIGS. 3, 4, and 5.

In one configuration, a method or apparatus for graphics processing is provided. The apparatus may be an AP, a display processor, a DPU, a display controller, a DDIC, a display panel, or an apparatus for display processing. In one aspect, the apparatus may be the processing unit 120 within the device 104, or may be some other hardware within device 104 or another device. The apparatus may include means for storing one or more pixel conversion factors for at least one display panel. The apparatus may also include means for determining whether to switch from a previous frame refresh rate to an updated frame refresh rate at the at least one display panel. The apparatus may also include means for identifying, upon determining to switch from the previous frame refresh rate to the updated frame refresh rate, a pixel conversion factor of the one or more pixel conversion factors associated with the updated frame refresh rate. The apparatus may also include means for refreshing the at least one display panel based on the updated frame refresh rate associated the pixel conversion factor. The apparatus may also include means for transmitting the pixel conversion factor of the one or more pixel conversion factors associated with the updated frame refresh rate. The apparatus may also include means for opening at least one adaptive variable rate (AVR) component upon transmitting the pixel conversion factor. The apparatus may also include means for stopping refreshing an internal refresh of the at least one display panel upon opening the at least one AVR component. The apparatus may also include means for applying the pixel conversion factor associated with the updated frame refresh rate upon transmitting the pixel conversion factor. The apparatus may also include means for communicating pixel data for a next frame based on the updated frame refresh rate. The apparatus may also include means for closing at least one adaptive variable rate (AVR) component upon communicating the pixel data for the next frame. The apparatus may also include means for switching, upon determining to switch from the previous frame refresh rate to the updated frame refresh rate, the at least one display panel to the updated frame refresh rate.

The subject matter described herein can be implemented to realize one or more benefits or advantages. For instance, the described display processing techniques can be used by an AP, a display processor, a DPU, a display controller, a DDIC, a display panel, an apparatus for display processing, or some other processor that can perform display processing to implement the FPS switching techniques described herein. This can also be accomplished at a low cost compared to other display processing techniques. Moreover, the display processing techniques herein can improve or speed up display processing or execution. Further, the display processing techniques herein can improve resource or data utilization and/or resource efficiency. Additionally, aspects of the present disclosure can utilize FPS switching techniques in order to save power, improve processing time, reduce latency, and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of display processing, comprising:

storing at least one gamma table including one or more pixel conversion factors for at least one display panel;

determining whether to switch from a previous frame refresh rate to an updated frame refresh rate at the at least one display panel;

identifying, based on a determination to switch from the previous frame refresh rate to the updated frame refresh rate, a pixel conversion factor of the one or more pixel conversion factors associated with the updated frame refresh rate, wherein the pixel conversion factor of the one or more pixel conversion factors corresponds to a gamma table of the at least one gamma table, and wherein the one or more pixel conversion factors are associated with a conversion from a digital pixel value to an analog pixel luminance value or a conversion from a digital sub-pixel value to an analog sub-pixel luminance value;

refreshing the at least one display panel based on the updated frame refresh rate associated the pixel conversion factor; and stopping refreshing an internal refresh of the at least one display panel based on opening at least one adaptive variable rate (AVR) component.

2. The method of claim 1, further comprising:

transmitting the pixel conversion factor of the one or more pixel conversion factors associated with the updated frame refresh rate.

3. The method of claim 2, further comprising:

opening the at least one AVR component based on transmission of the pixel conversion factor.

4. The method of claim 3, wherein the at least one AVR component is opened based on a command from an application processor (AP) to a display driver integrated circuit (DDIC).

5. The method of claim 2, further comprising:

applying the pixel conversion factor associated with the updated frame refresh rate upon transmitting the pixel conversion factor.

6. The method of claim 2, wherein an application processor (AP) sleeps for a time period after the pixel conversion factor is transmitted.

7. The method of claim 2, wherein the pixel conversion factor is transmitted to a display processor or a display driver integrated circuit (DDIC) via a display serial interface (DSI) link.

8. The method of claim 1, further comprising:

communicating pixel data for a next frame based on the updated frame refresh rate.

9. The method of claim 8, further comprising:

closing the at least one AVR component based on communication of the pixel data for the next frame.

10. The method of claim 9, wherein the at least one AVR component is closed based on a command from an application processor (AP) to a display driver integrated circuit (DDIC).

11. The method of claim 1, further comprising:

switching, upon determining to switch from the previous frame refresh rate to the updated frame refresh rate, the at least one display panel to the updated frame refresh rate.

12. The method of claim 11, wherein the at least one display panel is switched to the updated frame refresh rate by an application processor (AP).

13. The method of claim 1, wherein the updated frame refresh rate corresponds to at least one of a frame refresh time or a frame-per-second (FPS) value of the at least one display panel.

14. The method of claim 1, wherein the one or more pixel conversion factors are associated with at least one of a brightness level or a frame refresh rate of the at least one display panel.

15. An apparatus for display processing, comprising:

memory; and at least one processor coupled to the memory and configured to:

store at least one gamma table including one or more pixel conversion factors for at least one display panel;

determine whether to switch from a previous frame refresh rate to an updated frame refresh rate at the at least one display panel;

identify, based on a determination to switch from the previous frame refresh rate to the updated frame refresh rate, a pixel conversion factor of the one or more pixel conversion factors associated with the updated frame refresh rate, wherein the pixel conversion factor of the one or more pixel conversion factors corresponds to a gamma table of the at least one gamma table, and wherein the one or more pixel conversion factors are associated with a conversion from a digital pixel value to an analog pixel luminance value or a conversion from a digital sub-pixel value to an analog sub-pixel luminance value;

refresh the at least one display panel based on the updated frame refresh rate associated the pixel conversion factor; and stop refreshing an internal refresh of the at least one display panel based on opening at least one adaptive variable rate (AVR) component.

16. The apparatus of claim 15, wherein the at least one processor is further configured to:

transmit the pixel conversion factor of the one or more pixel conversion factors associated with the updated frame refresh rate.

17. The apparatus of claim 16, wherein the at least one processor is further configured to:

open the at least one AVR component based on transmission of the pixel conversion factor.

18. The apparatus of claim 17, wherein to open the at least one AVR component, the at least one processor is configured to open the at least one AVR component based on a command from an application processor (AP) to a display driver integrated circuit (DDIC).

19. The apparatus of claim 16, wherein the at least one processor is further configured to:

apply the pixel conversion factor associated with the updated frame refresh rate upon transmitting the pixel conversion factor.

20. The apparatus of claim 16, wherein an application processor (AP) is configured to sleep for a time period after transmission of the pixel conversion factor.

21. The apparatus of claim 16, wherein to transmit the pixel conversion factor, the at least one processor is configured to transmit the pixel conversion factor to a display processor or a display driver integrated circuit (DDIC) via a display serial interface (DSI) link.

22. The apparatus of claim 15, wherein the at least one processor is further configured to:

communicate pixel data for a next frame based on the updated frame refresh rate.

23. The apparatus of claim 22, wherein the at least one processor is further configured to:

close the at least one AVR component based on communication of the pixel data for the next frame.

24. The apparatus of claim 23, wherein to close the at least one AVR component, the at least one processor is configured to close the at least one AVR component based on a command from an application processor (AP) to a display driver integrated circuit (DDIC).

25. The apparatus of claim 15, wherein the at least one processor is further configured to:

switch, upon determining to switch from the previous frame refresh rate to the updated frame refresh rate, the at least one display panel to the updated frame refresh rate.

26. The apparatus of claim 25, wherein to switch the at least one display panel, the at least one processor is configured to switch the at least one display panel to the updated frame refresh rate by an application processor (AP).

27. The apparatus of claim 15, wherein the updated frame refresh rate corresponds to at least one of a frame refresh time or a frame-per-second (FPS) value of the at least one display panel.

28. The apparatus of claim 15, wherein the one or more pixel conversion factors are associated with at least one of a brightness level or a frame refresh rate of the at least one display panel.

29. An apparatus for display processing, comprising:

means for storing at least one gamma table including one or more pixel conversion factors for at least one display panel;

means for determining whether to switch from a previous frame refresh rate to an updated frame refresh rate at the at least one display panel;

means for identifying, based on a determination to switch from the previous frame refresh rate to the updated frame refresh rate, a pixel conversion factor of the one or more pixel conversion factors associated with the updated frame refresh rate, wherein the pixel conversion factor of the one or more pixel conversion factors corresponds to a gamma table of the at least one gamma table, and wherein the one or more pixel conversion factors are associated with a conversion from a digital pixel value to an analog pixel luminance value or a conversion from a digital sub-pixel value to an analog sub-pixel luminance value;

means for refreshing the at least one display panel based on the updated frame refresh rate associated the pixel conversion factor; and means for stopping refreshing an internal refresh of the at least one display panel based on opening at least one adaptive variable rate (AVR) component.

30. The apparatus of claim 29, further comprising:

means for transmitting the pixel conversion factor of the one or more pixel conversion factors associated with the updated frame refresh rate.

31. The apparatus of claim 30, further comprising:

means for opening the at least one AVR component based on transmission of the pixel conversion factor.

32. The apparatus of claim 31, wherein the at least one AVR component is opened based on a command from an application processor (AP) to a display driver integrated circuit (DDIC).

33. The apparatus of claim 30, further comprising:

means for applying the pixel conversion factor associated with the updated frame refresh rate upon transmitting the pixel conversion factor.

34. The apparatus of claim 30, wherein an application processor (AP) sleeps for a time period after the pixel conversion factor is transmitted.

35. The apparatus of claim 30, wherein the pixel conversion factor is transmitted to a display processor or a display driver integrated circuit (DDIC) via a display serial interface (DSI) link.

36. The apparatus of claim 29, further comprising:
means for communicating pixel data for a next frame based on the updated frame refresh rate.

37. The apparatus of claim 36, further comprising:
means for closing the at least one AVR component based on communication of the pixel data for the next frame.

38. The apparatus of claim 37, wherein the at least one AVR component is closed based on a command from an application processor (AP) to a display driver integrated circuit (DDIC).

39. The apparatus of claim 29, further comprising:
means for switching, upon determining to switch from the previous frame refresh rate to the updated frame refresh rate, the at least one display panel to the updated frame refresh rate.

40. The apparatus of claim 39, wherein the at least one display panel is switched to the updated frame refresh rate by an application processor (AP).

41. The apparatus of claim 29, wherein the updated frame refresh rate corresponds to at least one of a frame refresh time or a frame-per-second (FPS) value of the at least one display panel.

42. The apparatus of claim 29, wherein the one or more pixel conversion factors are associated with at least one of a brightness level or a frame refresh rate of the at least one display panel.

43. A non-transitory computer-readable medium storing computer executable code for display processing, the code when executed by a processor causes the processor to:
store at least one gamma table including one or more pixel conversion factors for at least one display panel;
determine whether to switch from a previous frame refresh rate to an updated frame refresh rate at the at least one display panel;
identify, based on a determination to switch from the previous frame refresh rate to the updated frame refresh rate, a pixel conversion factor of the one or more pixel conversion factors associated with the updated frame refresh rate, wherein the pixel conversion factor of the one or more pixel conversion factors corresponds to a gamma table of the at least one gamma table, and wherein the one or more pixel conversion factors are associated with a conversion from a digital pixel value to an analog pixel luminance value or a conversion from a digital sub-pixel value to an analog sub-pixel luminance value;
refresh the at least one display panel based on the updated frame refresh rate associated the pixel conversion factor; and
stop refreshing an internal refresh of the at least one display panel based on opening at least one adaptive variable rate (AVR) component.

* * * * *